May 27, 1924.

A. I. WOODRING ET AL 1,495,376

COMBINATION TROLLEY SHOE AND WHEEL

Filed Sept. 29, 1923

Inventors,
A. I. Woodring, and
W. G. Lamb, by
G. C. Kennedy
Attorney.

Patented May 27, 1924.

1,495,376

UNITED STATES PATENT OFFICE.

ALBERTO I. WOODRING AND WILLIAM G. LAMB, OF WATERLOO, IOWA, ASSIGNORS TO NATIONAL SAFETY DEVICES COMPANY, OF WATERLOO, IOWA.

COMBINATION TROLLEY SHOE AND WHEEL.

Application filed September 29, 1923. Serial No. 665,681.

*To all whom it may concern:*

Be it known that we, ALBERTO I. WOODRING and WILLIAM G. LAMB, citizens of the United States of America, and residents of Waterloo, Blackhawk County, Iowa, have invented certain new and useful Improvements in Combination Trolley Shoes and Wheels, of which the following is a specification.

Our invention relates to improvements in combination trolley shoes and wheels, and the object of our improvement is to supply a device of this type having a contact shoe for most effective electrical contact with a trolley wire in moving forwardly, and having a contact wheel for occasional use while backing up, the device being pivotally mounted upon the trolley pole and harp, with auxiliary elements functioning in limiting the scope of movement and in resiliently controlling the device.

This object we have accomplished by the means which are hereinafter described and claimed, and which are illustrated in the accompanying drawings, it being understood that changes in the precise embodiment of invention herein disclosed can be made within the scope of what is claimed without departing from the spirit of the invention.

Figure 1:
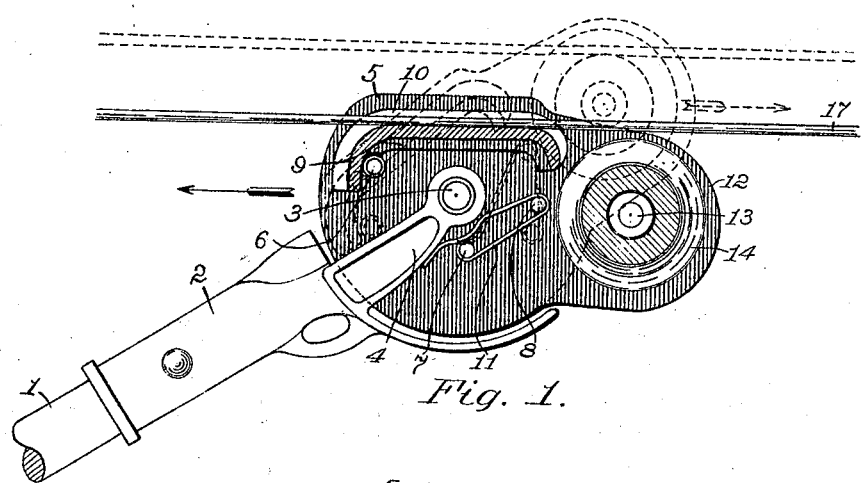
Figure 2:
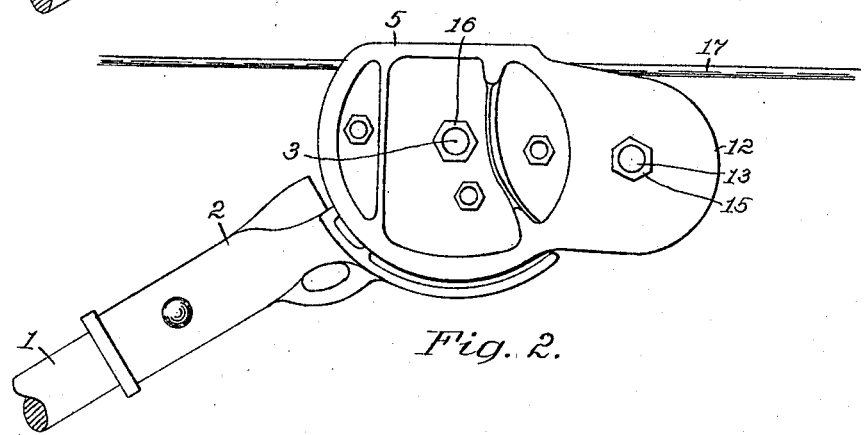
Figure 3:
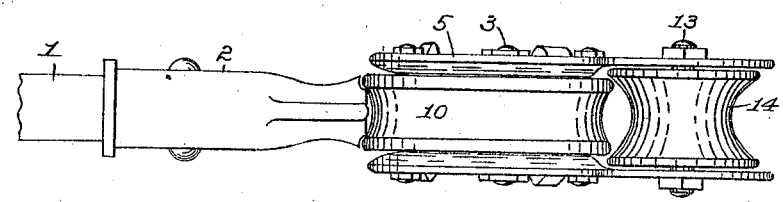

In the drawings, Fig. 1 is a view, partly in side elevation and partly in section with parts broken away or removed, of our combination trolley shoe and wheel as pivotally mounted on the harp of a trolley pole, the full lines and the dotted lines disclosing different operative positions of the device while moving forwardly or rearwardly respectively. Fig. 2 is a side elevation of the device, and Fig. 3 is a top plan thereof.

The numeral 1 denotes the upper end of a trolley pole such as is commonly mounted upon a vehicle and having a terminal harp 2 with longitudinal projection 4 supplied with a transverse hole in which is loosely mounted a pintle bolt 3, the opposite threaded ends of which are passed through holes in side plates 5 and secured by means of nuts 16. The side plates 5 are also connected by means of the diminished head double ended bolts 6, 7 and 8 and nuts. The plates 5 have the rearwardly directed parallel spaced extensions 12 orificed to seat the end parts of a pintle 13 on which a trolley wheel 14 is rotatably mounted, the opposite threaded extremities of the pintle 13 being secured to the plates 5—12 by means of nuts 15. The wheel 14 has the usual deep circumferential groove to seat a trolley wire 17 above it.

Above the pintle bolt 3 on the upper part of the inner wall of each side plate 5 forward of the wheel 14 is a longitudinally disposed integral ledge 9 with downwardly curved ends and located directly opposite each other, and supported thereon and secured between said side plates 5 by their clamping contacts is a longitudinally troughed contact shoe 10 also having downwardly curved ends. This shoe is adapted to contact with the trolley wire 17 while moving forwardly as indicated by the arrow in full lines in Fig. 1.

The numeral 11 denotes a bar spring which is bent medially about the bolt 8, having one extremity hooked about the bolt 7 and its other extremity contacting with the lower edge of the harp projection 4.

As shown in full lines in Fig. 1, the tractional pull of the pole 1 and harp 2 upon the pivoted side plates 5 rocks the latter into position where the shoe 10 receives the trolley wire into longitudinal contact with its groove, while compressing the spring 11. In backing up, the push of the device on the wire 17 as the wire lifts or is at a curve at a higher position permits the spring 11 to react in rocking the connected plates 5 upwardly, so that the shoe 10 moves downwardly out of contact with the wire 17 while the wheel 14 moves upwardly into contact with the wire, as indicated by the dotted lines in said Fig. 1, and the dotted line arrow indicating the changed direction of movement of the trolley. This arrangement prevents riding of the device off from the wire as the wheel 14 will move more readily around curves than the shoe 10. It will be seen that the positions of the shoe 10 and the wheel 14 are such relative to the harp 2—4 that both cannot contact with the wire simultaneously while the vehicle is moving either way.

It will be seen that the cross bolt 6 limits the scope of pivotal movement of the connected plates 5 in one direction, while the cooperating bolt 7 and the spring 11 limit the movement of the said plates in an opposite direction.

Having described our invention, what we claim as new, and desire to secure by Letters Patent, is:

1. In a device of the class described, a trolley harp, a hub member pivoted thereon, a shoe mounted on said member, a trolley wheel also mounted on said member freely rotatable thereon, and yieldable resilient means operable upon said member to rock it in one direction.

2. In a device of the class described, a trolley harp, a hub member pivoted thereon, a shoe mounted on said member, a trolley wheel also mounted on said member rotatably, means for limiting the scope of rocking movement of said member in either direction, and a yieldable resilient device operable upon said member to rock it in one direction.

3. In a device of the class described, a trolley harp, a shoe pivotally mounted on said harp, a trolley wheel mounted rotatably on said shoe, and yieldable means operable upon said shoe to rock it in one direction.

4. In a device of the class described, a trolley harp, a shoe pivotally mounted on said harp, a trolley wheel rotatably mounted upon said shoe, means for limiting the rocking movement of said shoe, and a yieldable resilient means operable upon said shoe to rock it in one direction.

Signed at Waterloo, Iowa, this 26th day of September, 1923.

ALBERTO I. WOODRING.
WILLIAM G. LAMB.